F. KREBS.
SEPARATOR FOR COTTON SEED OIL MILLS.
APPLICATION FILED OCT. 23, 1912.
1,131,845.
Patented Mar. 16, 1915.
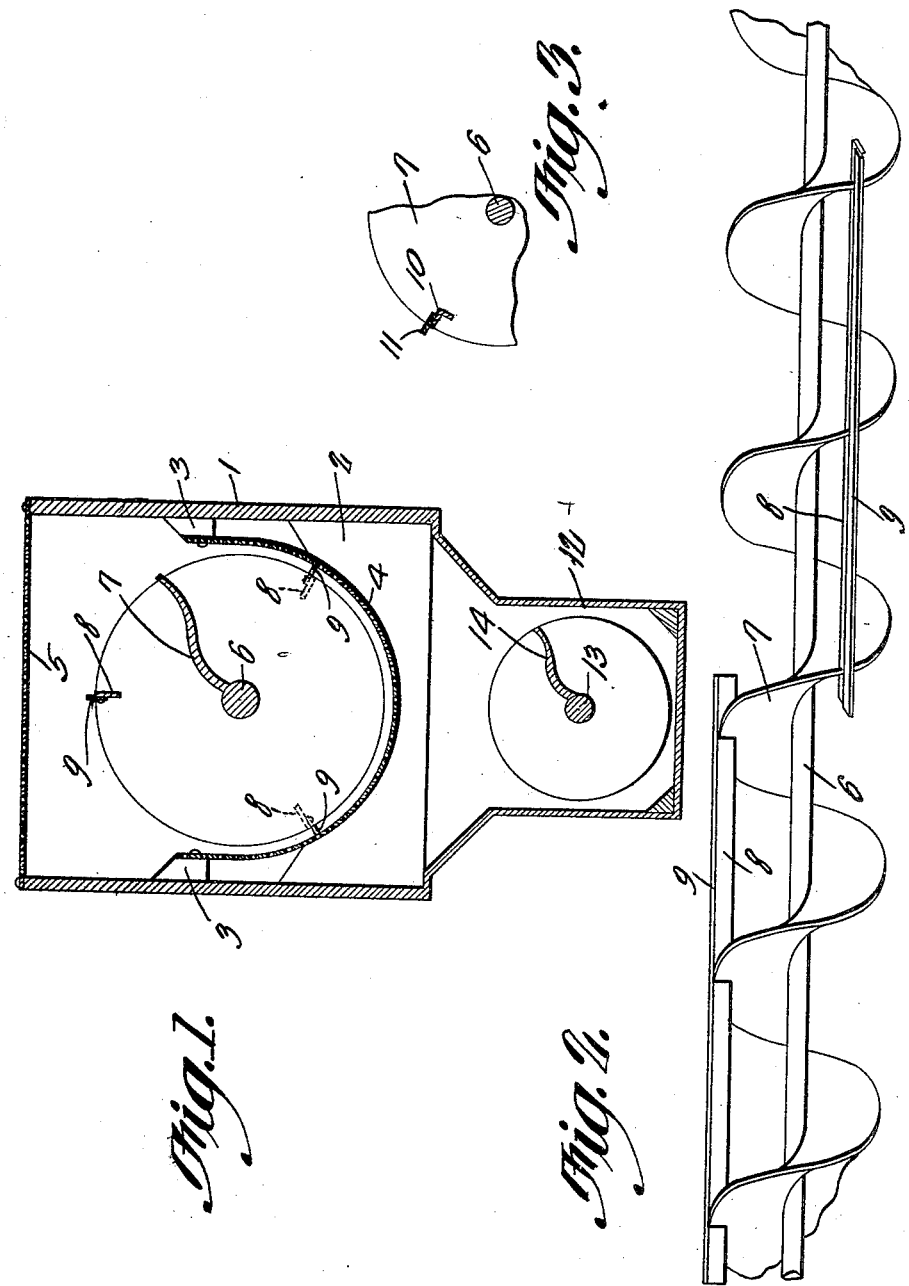
Witnesses
Ferdinand Krebs Inventor
by
Attorneys

UNITED STATES PATENT OFFICE.

FERDINAND KREBS, OF PINE BLUFF, ARKANSAS.

SEPARATOR FOR COTTON-SEED-OIL MILLS.

1,131,845.  Specification of Letters Patent.  Patented Mar. 16, 1915.

Application filed October 23, 1912.  Serial No. 727,462.

*To all whom it may concern:*

Be it known that I, FERDINAND KREBS, a citizen of the United States, residing at Pine Bluff, in the county of Jefferson and State of Arkansas, have invented a new and useful Separator for Cotton-Seed-Oil Mills, of which the following is a specification.

The present invention relates to improvements in separators for cotton seed oil mills, and more especially to a means for the separation of the kernel from the hulls of the cotton seed, the primary object of the invention being the provision of a novel means attached to the spiral conveyer for clearing the perforations during the churning of the hulls by the endless conveyer, such means making it impossible for the hulls to form a layer at the bottom or for the spiral to form a groove or track through the hulls.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is climed without departing from the spirit of the invention.

In the drawings—Figure 1 is a transverse sectional view of a cotton seed hull and meat separator. Fig. 2 is a view in elevation of a conveyer flight with the present invention applied thereto. Fig. 3 is a view showing a modified form of the present invention applied to a conveyer flight.

Referring to the drawings, the numeral 1 designates the conveyer box or hopper, which has mounted thereon, a brace plate 2 and two oppositely disposed strips 3, said brace 2 and strips 3 forming a means for properly supporting the perforated conveyer lining 3, while disposed over the upper open end of the hopper or box 1 is a sheet 5, of perforated metal providing ventilating means for cooling the products, ground cotton seed, being operated upon by the spiral conveyer 7 carried by the shaft 6.

The structure as described is of well known formation, and has mounted in the lower extension 12 of the hopper or casing box 1, a meat receiving box in which is mounted the shaft 13 carrying the spiral conveyer 14.

In machines of this character, the spiral conveyer 7 often cuts a spiral track through the meat and hulls being moved over the upper surface of the perforated plate 4, so that the material is not conveyed, while in many cases the perforations in the plate 4 are so filled with the meat from the seed as to prevent the proper feeding therethrough, and in order to prevent this, the metal strips 8 are seated within the peripheral edge of the spiral, as clearly shown in Figs. 1 and 2, and such strip is sufficiently long to span several spaces between the spirals and are set alternating as shown in Fig. 2 as one of these strips at one point of the periphery of the conveyer is ample to perform the desired operation of preventing the caking of the hulls and for sweeping the sheet so that the meat will readily pass through the perforations of the sheet 4.

It has been found in practice, that it is best to place these strips in the position as shown in Fig. 1, or three to the full circumference of the conveyer and that the respective ends of the strips 8 will overlap, as shown in Fig. 2, so that no space will be between the ends during the rotation of the conveyer and which would tend to permit of the formation of a bulk of the material between such ends.

Connected to the edge of the respective strips 8 and projecting beyond the periphery of the conveyer spiral is a flexible strip 9 preferably of leather or some tough material, such strip being disposed to wipe or sweep the inner face of the curved sheet 4 of perforated material and thus insure the cleaning of the surface and the perforations.

In the form shown in Figs. 1 and 2, the metal plates each are rectangular in cross section, while as shown in Fig. 3, an L-shaped in cross section or angle iron 10 carrying the flexible strip 11 is provided. The latter form is employed where the work required is heavier and it is necessary to brace the strips against bending.

From the foregoing description, taken in connection with the drawings, it is evident that the plates 8 and 10 form in reality beater arms for the conveyer flight, and with the flexible strips 9 and 11 provide a means to properly sweep the inner surface of the metal plate 4 so as to prevent the adherence of the meat and hulls thereto and at the same time, permit the meat to fall through the perforations within the hopper 12 and be removed therefrom by means of the conveyer 14. It is also evident that the present device may be readily applied to the meat and hull separators now used in cotton seed oil mills, and that such device will prevent the grooving of the material by the conveyer flight, and insure the proper feeding of the material through the hopper and at the same time keep the perforations of the sheet metal plates 4 clear, so that the meat will be properly fed therethrough during the rotation of the spiral conveyer. By this means the flexible wipers 9—11 constitute a sweeper device which will sweep the sheet 4 and permit the meat to readily pass through the perforations of the metal plate 4 and at the same time prevent the adherence thereto of the hulls of the seeds.

What is claimed is:

In a machine of this character, a perforated separator sheet, a shaft, a spiral conveyer carried by the shaft and provided at its outer edges with a plurality of alined L-shaped slots open through the outer edge, an angle iron fitted in said slots and carried by the spiral, and a flexible scraper strip attached to and carried by the angle iron.

In testimony that I claim the foregoing as my own, I have hereto affixed my signature in the presence of two witnesses.

FERDINAND KREBS.

Witnesses:
A. C. Grove,
C. F. Shell.

Copies of this patent may be obtained for five cents each, by addressing the "Commissioner of Patents, Washington, D. C."